United States Patent [19]

Axelrod

[11] Patent Number: 5,476,069
[45] Date of Patent: Dec. 19, 1995

[54] MOLDED RAWHIDE CHEW TOY

[76] Inventor: Herbert R. Axelrod, 6 Marine Pl., Deal, N.J. 07753

[21] Appl. No.: 310,575

[22] Filed: Sep. 22, 1994

[51] Int. Cl.⁶ ........................................... A01K 5/00
[52] U.S. Cl. ................................................ 119/709
[58] Field of Search ..................... 119/707, 709, 119/710, 711; 426/104, 512, 513, 641, 805, 646

[56] References Cited

U.S. PATENT DOCUMENTS

| | | |
|---|---|---|
| 2,988,045 | 6/1961 | Fisher . |
| 3,123,047 | 3/1964 | Fisher . |
| 3,198,173 | 8/1965 | Fisher . |
| 3,441,001 | 4/1969 | Fisher . |
| 4,145,447 | 3/1979 | Fisher . |
| 4,260,635 | 4/1981 | Fisher . |
| 4,364,925 | 12/1982 | Fisher . |
| 4,702,929 | 10/1987 | Lehn et al. ............... 426/805 |
| 5,033,410 | 7/1991 | Sigurdsson . |
| 5,114,704 | 5/1992 | Spanier et al. . |
| 5,186,124 | 2/1993 | Woodford . |
| 5,200,212 | 4/1993 | Axelrod ................... 426/641 |

*Primary Examiner*—Thomas Price

[57] ABSTRACT

A rawhide-derived dog chew wherein rawhide is comminuted and then melted as it is injection molded. The melting of the rawhide sterilizes it to prevent the foul odor normally associated with rawhide products, while the injection molding of the molten material allows much larger forms to be molded than is possible with the use of compression molding while yielding a consistency and chewability preferred by most dogs.

10 Claims, No Drawings

MOLDED RAWHIDE CHEW TOY

BACKGROUND OF THE INVENTION

1. Field of the Invention

The present invention generally relates to dog chews, and more particularly, pertains to rawhide chew toys.

2. Description of Related Art

Most dogs enjoy chewing on things, and many are especially attracted to rawhide-derived products. A variety of methods are employed in treating and preparing rawhide in an effort to produce an acceptable chew product. A popular approach involves simply rolling a wet sheet of rawhide into a cylindrical form, knotting its ends, and letting it dry. Alternatively, the rawhide is cut into long thin strips that are moistened and then compressed into a desired shape. Disadvantages inherent in such products include the potential for injury to the dog. As the dog chews on the rawhide, the mechanical action, in combination with saliva, will eventually cause the rawhide to break up. Unfortunately, relatively large pieces tend to become dissociated from products employing bulk-rawhide and swallowing such pieces can cause choking or intestinal blockage with potentially dire consequences. Additionally, since rawhide comprises organic matter, it is usually in some stage of decay. Consequently, ingestion thereof can cause an adverse reaction in some dogs, including vomiting. The decaying matter also serves to impart a bad odor to the product and anything that it comes in contact with such as furniture or carpeting.

In an effort to address the problem of choking and intestinal blockage associated with bulk rawhide, products have been developed utilizing rawhide that has been chopped, sliced, shredded, ground, pulverized, or otherwise comminuted. The pieces are then wetted, optionally fortified with adhesives, resins, etc., and finally compaction or compression molded. Although the removal of a significant portion of the water during the molding process enhances the resulting product's integrity, the compression molding process nonetheless has its limits with regard to the ultimate strength characteristics of the final product. Limiting the moldings to relatively small sizes also serves to yield a stronger product, although peeling or delaminating is still a problem. While the disassociated particles tend to be of a physically small size and are therefore able to pass harmlessly through the dog's intestinal tract, ingestion thereof can nonetheless cause problems. As set forth above, the rawhide's state of decay can induce an adverse reaction in the dog, and its foul odor is objectionable.

An additional approach has been employed in the past wherein comminuted rawhide, in combination with a variety of additives, is first compression molded and then baked. While the baking step has a sterilizing effect and thereby addresses the decay problem described above, the end product tends to be extremely hard and dense, and is therefore not particularly "chewable." Moreover, due to its brittleness, it is quickly and easily shattered by a large dog, and consequently is quickly consumed.

SUMMARY OF THE INVENTION

The present invention provides a rawhide derived chew toy that overcomes the above-described disadvantages associated with the prior art. The chew product has a consistency preferred by most dogs, is not brittle and therefore tends not to shatter or splinter, does not break down into pieces large enough to choke on or to cause intestinal blockage, and lacks the foul odor normally associated with rawhide chew toys.

These advantageous characteristics are achieved by first chopping or grinding the rawhide into small pieces, drying the pieces, and then melting the pieces as they are injected into a mold. The molded form is then allowed to harden while its moisture content is adjusted to a preselected level. Various additives may be added to the rawhide in order to enhance its moldability, its nutritional content, and/or its attractiveness to dogs.

In the course of subjecting the rawhide to melting temperatures during the injection molding process, the material becomes sterilized. This serves to interrupt any decaying process that may be in progress, and thereby alleviates the foul odor normally associated with rawhide chew toys. Furthermore, sterilization is achieved without baking the molded material so as to yield a very chewable product with a consistency and texture preferred by most dogs. By injection molding a molten medium, a substantially more cohesive product is formed than is possible using compression or compaction molding techniques.

These and other features and advantages of the present invention will become apparent from the following detailed description of a preferred embodiment which illustrates by way of example the principles of the invention.

DETAILED DESCRIPTION OF PREFERRED EMBODIMENTS

The improved rawhide derived dog chew of the present invention is prepared as follows:

Rawhide is chopped or ground into small particles or powder such that the largest particles do not exceed 0.25" across their largest dimension. These particles are then dried so as to adjust their moisture content to less than about 8½% by weight. Up to 10% about by weight casein, and up to about 5% by weight gelatin may then optionally be added to facilitate molding and to adjust the chewability of the ultimate product. Various attractants and/or certain nutrients such as, for example, vitamins may additionally be added to the dried rawhide particles.

The dried particles are then fed into an injection molding machine having a barrel temperature of about 280° F. and barrel pressure of about 1000 psi which causes most of the particles to melt. The heat serves to sterilize the mixture while the commensurate liquification ensures that a relatively homogeneous mixture of rawhide, casein, gelatin, and any additives results. Homogeneity is most desirable as clumps of high concentrations of certain vitamins for example could be deleterious to the dog's health. The product may be molded into any of a variety of shapes, including for example, the general shape of a bone.

After the mold has been injected, it is cooled sufficiently to cause the molded form to re-solidify to thereby allow it to be ejected or extracted from the mold. Finally, the product is allowed to harden over the course of about a week, while its moisture content is adjusted to about 12–14% by weight.

It has been found that dogs find the resulting product especially attractive, presumably by virtue of its chewability and consistency. As the dog chews on the product, small slivers thereof become dislodged at which point the dog gains the benefit of any of the nutritional components contained therein, while the indigestible components pass harmlessly through the dog's digestive tract as roughage. The consistency of product is such that it takes most dogs many days to consume.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A method of forming a dog chew, comprising the steps of:

comminuting rawhide;

melting said dried comminuted rawhide;

injection molding said molten dried comminuted rawhide; and allowing said molding to harden.

2. The method of claim 1 wherein said rawhide is comminuted to particles no larger than 0.25" in any dimension.

3. The method of claim 2 wherein said comminuted particles are dried sufficiently to reduce their moisture content to about 8½% by weight.

4. The method of claim 3 further comprising the step of adding casein and gelatin to the dried particles.

5. The method of claim 4 wherein said casein is added at approximately 10% by weight, and said gelatin is added by about 5% by weight.

6. The method of claim 3 wherein the moisture content of said molding is increased to about 12–14% by weight as it hardens.

7. The method of claim 1 wherein said molding is in the form of a bone.

8. A method of forming a dog chew, comprising the steps of:

comminuting rawhide to particles no larger than 0.25" in any dimension;

drying said comminuted particles to a moisture content of about 8½% by weight;

mixing approximately 10% by weight of casein, and 5% of gelatin in with the rawhide;

injection molding said mixture while subjecting it to heat and pressure sufficient to cause said rawhide particles to melt; and allowing said molding to harden while adjusting its moisture content to increase to about 12–14%.

9. The method of claim 8 wherein said mixture is subjected to about 280° F., and 1000 psi during the injection molding step.

10. The method of claim 8 wherein said mixture is molded into the form of a bone.

* * * * *